US010753600B2

(12) United States Patent
Kovacevic (10) Patent No.: US 10,753,600 B2
(45) Date of Patent: Aug. 25, 2020

(54) TURBINE SYSTEM AND METHOD

(71) Applicant: CASTLE EUROPEAN LIMITED, Edinburgh (GB)

(72) Inventor: Aleksandar Kovacevic, Belgrade (RS)

(73) Assignee: CASTLE EUROPEAN LIMITED, Edinburgh (GB)

( * ) Notice: Subject to any disclaimer, the term of this patent is extended or adjusted under 35 U.S.C. 154(b) by 42 days.

(21) Appl. No.: 15/578,371

(22) PCT Filed: Jun. 3, 2016

(86) PCT No.: PCT/GB2016/051655
§ 371 (c)(1),
(2) Date: Nov. 30, 2017

(87) PCT Pub. No.: WO2016/193759
PCT Pub. Date: Dec. 8, 2016

(65) Prior Publication Data
US 2018/0149353 A1    May 31, 2018

(30) Foreign Application Priority Data

Jun. 3, 2015  (GB) .................................. 1509651.4

(51) Int. Cl.
*F22B 31/08*    (2006.01)
*F22B 37/02*    (2006.01)
*F22B 37/26*    (2006.01)

(52) U.S. Cl.
CPC .............. *F22B 31/08* (2013.01); *F22B 37/02* (2013.01); *F22B 37/266* (2013.01); *Y02B 30/52* (2013.01); *Y02E 20/14* (2013.01)

(58) Field of Classification Search
CPC ...................................................... F22B 31/08
See application file for complete search history.

(56) References Cited

U.S. PATENT DOCUMENTS

| 3,040,537 A | 6/1962 | Arnow |
| 3,835,650 A | 9/1974 | Chesmejef |
| 4,380,147 A * | 4/1983 | Zaba .................. F22B 31/0084 |
| | | 60/39.182 |

(Continued)

FOREIGN PATENT DOCUMENTS

| GB | 721099 A | 12/1954 |
| JP | 2007205188 A | 8/2007 |

(Continued)

OTHER PUBLICATIONS

UK Search Report under Section 17(5) of International Patent Application GB1509651.4 dated Nov. 30, 2015.

(Continued)

*Primary Examiner* — Nathaniel Herzfeld
(74) *Attorney, Agent, or Firm* — Moore & Van Allen PLLC; W. Kevin Ransom (57) ABSTRACT

A power generating system includes a condensing steam turbine fed with steam from a boiler, wherein the air supply for the boiler combustion process is preheated by means of a heat pump system comprising at least one heat pump with at least one compressor, before entry to the boiler. A method for generating power using the power generating system is also described. A method and apparatus for extracting heat from the gases of a combustion process are also described.

19 Claims, 3 Drawing Sheets

(56) References Cited

U.S. PATENT DOCUMENTS

| | | | | |
|---|---|---|---|---|
| 5,224,357 A | * | 7/1993 | Galiyano | F25B 1/04 |
| | | | | 62/260 |
| 5,293,841 A | | 3/1994 | Suhr et al. | |
| 5,713,195 A | | 2/1998 | Bronicki et al. | |
| 2003/0000213 A1 | * | 1/2003 | Christensen | F01K 25/08 |
| | | | | 60/670 |
| 2011/0113779 A1 | * | 5/2011 | Polvi | F01K 23/062 |
| | | | | 60/646 |
| 2011/0259253 A1 | * | 10/2011 | Higgins | F23B 30/06 |
| | | | | 110/341 |
| 2012/0324903 A1 | * | 12/2012 | Dewis | F02C 7/143 |
| | | | | 60/772 |
| 2013/0098104 A1 | * | 4/2013 | hman | B01D 5/0012 |
| | | | | 62/617 |
| 2014/0196455 A1 | * | 7/2014 | Kuo | F03G 6/005 |
| | | | | 60/641.8 |

FOREIGN PATENT DOCUMENTS

| | | |
|---|---|---|
| JP | 2012132618 A | 7/2012 |
| JP | 2012163265 A | 8/2012 |
| WO | 2012137010 A2 | 10/2012 |

OTHER PUBLICATIONS

International Search Report for PCT/GB2016/051655 dated Sep. 2, 2016.

Written Opinion of the International Searching Authority for PCT/GB2016/051655 dated Sep. 2, 2016.

* cited by examiner

TURBINE SYSTEM AND METHOD

CROSS-REFERENCE TO RELATED APPLICATION(S)

This application is a national stage application (filed under 35 § U.S.C. 371) of PCT/GB2016/051655, filed Jun. 3, 2016 of the same title, which, in turn claims priority to Great Britain Application No. 1509651.4, filed Jun. 3, 2015 of the same title; the contents of each of which are hereby incorporated by reference.

FIELD OF THE INVENTION

The present invention relates to the provision of power generating systems employing a condensing steam turbine fed with steam from a boiler, in particular to those employing biomass as fuel, or primary fuel, to the boiler.

BACKGROUND TO THE INVENTION

Conventional steam cycle power plants using condensing steam turbines use steam extraction from the steam turbine to heat up boiler feed water to the appropriate temperature for use in the boiler.

In fossil fuel boilers, the appropriate temperature tends to be relatively high in order to avoid acid condensation at the entry/exit surfaces of the boiler.

Biomass fuel has the advantage of being virtually free of sulphur and other acidifying substances and so the risk of acid condensation is greatly reduced. The boiler vessel is pressurized and the flame temperature regulated in order to control $NO_x$ formation that may create a risk of acid condensation. Therefore, the deviation (condensation) point of the system remains at a relatively high temperature.

Modern boilers utilize energy from flue gases to the greatest extent possible. In circumstances where the flue gas is sufficiently free from acidifying substances, such as with biomass burning systems, and regulated flame temperature, the system may even provide for complete condensation of flue gas. Condensation of the flue gas provides an opportunity to utilize the latent heat of the fuel and allows for Low Heating Value (LHV) thermal efficiencies greater than 100%.

Nevertheless, despite the range of options available for producing power from steam cycle power plants there remains the desire to provide improvements in terms of efficiency, flexibility, emissions and scalability.

Environmental considerations especially in respect of carbon dioxide emissions are also increasingly relevant in terms of power plant design.

SUMMARY OF THE INVENTION

The present invention provides a power generating system comprising;

a condensing steam turbine fed with steam from a boiler, wherein the air supply for the boiler combustion process is preheated by means of a heat pump system comprising at least one heat pump, before entry to the boiler.

The preheating of the air supply may be carried out by means of a heat pump or heat pumps of the heat pump system, extracting heat from an energy source, for example a low grade energy source. Advantageously the low grade energy source is the cooling system employed to condense the steam from the condensing steam turbine. In typical condensing steam turbine systems this source of low grade heat is, typically, a water based cooling system (the "steam cycle cooling water"). The heat extracted from the condensing steam is normally either lost to a cooling arrangement such as a cooling tower or may be used for local heating (e.g. a district heating system).

Any other low grade energy source (a "waste heat" source) may be employed to provide low grade energy for upgrading via the heat pump system. More advantageously more than one energy source, typically energy sources of the power generating system, is employed to provide energy for upgrading by the heat pump system. For example low grade energy may be supplied from a flue gas cooling and condensation process of the power generating system; such as described further hereafter with reference to particular embodiments. Other energy sources associated with the power generating system can include one or more of: waste heat from rotating equipment (such as a generator powered by the steam turbine or a generator powered by an engine or other means for starting up and/or augmenting the power generating system); waste heat from transformation equipment (the transformer or transformers supplying the electrical power produced by the system); rejected heat from cooling the steam turbine itself (from lubrication etc); and rejected heat from ash disposal.

Use of two or more of these energy sources as a supply to the heat pump system improves efficiency.

The heat pump system may include an energy storage device, such as a tank of water, for storing thermal energy. This can add to the flexibility of the heat pump system and hence of the power generating system as a whole.

Other sources of low grade heat may be employed as an alternative to or additionally to the heat from the cooling system for the condensing steam turbine and the other options described above that are derived from the plant processes of the energy generating system. For example, energy from thermal solar (e.g. via one or more solar panels) or geothermal sources or from cooling systems employed in factory processes. Utilising the heat from cooling system employed to condense the steam from the condensing steam turbine advantageously raises the efficiency of the steam cycle.

Preheating the air supply to the combustion process in the boiler provides a number of advantages. Boilers are typically designed to pre-heat the incoming air prior to entry to the combustion process, by exchange of heat with the flue gas within the boiler. As the flue gas must be kept at a sufficiently high temperature to avoid problems e.g. with corrosion caused by condensation and acid gases, each boiler is designed to cope with expected local conditions in terms of ambient air temperature. There must be sufficient capability to heat the air, even in cold conditions and still maintain an acceptable flue gas temperature to allow exhaust without causing difficulty.

Heating the air supply to a selected temperature or temperature range by means other than a boiler or flue gas from the boiler is preferred as this allows the boiler design to be the same for different locations, having different climatic conditions or altitude.

Use of a variable drive heat pump (i.e. a heat pump with a variable drive compressor or compressors) is convenient in allowing the heat supplied to the air to be adjusted to provide the desired heated air input to the boiler regardless of climatic conditions or other variables.

More generally, the heat pump system employed will typically comprise a plurality of heat pumps. The use of more than one heat pump is convenient. The heat pumps may be employed in parallel and/or in series to provide the required upgrading of the heat quality. The output of the heat pump system may be adjusted as desired by taking one or more pumps offline or putting one or more pumps online. One or more pumps may be taken offline for repair or replacement without requiring shutdown of the heat pump system. Each heat pump of the heat pump system will have one or more compressors. Preferably, for fine control of the heat pump system, at least one variable drive heat pump is employed. More preferably all the heat pumps employed are variable drive (each has a variable drive compressor or compressors). The number and size of heat pumps depends on the duty required e.g. on the size of the boiler or boilers of the power generating system. Boilers typically have several air inlets, to aid in providing a smooth and efficient combustion process. Advantageously the heat pump system includes at least one heat pump for each air inlet of a boiler.

The working fluid for heat pumps employed in the system may be of several kinds of refrigerant including halocarbon fluids, organic fluids, ammonia and carbon dioxide. For the temperature and pressure conditions envisaged for power generating systems of the invention (typically heating ambient air from 11° C. to over 90° C., carbon dioxide is especially useful as it operates at high working pressures and temperatures than other working fluids, providing efficient energy transfer. As heat pumps or heat pump systems employed in the invention may operate with a relative Coefficient of Performance (COP) of more than 3.6 when suitable temperature difference between the input and output is available, high efficiencies in comparison with other energy recycling techniques may be achieved.

Heating the air supply raises the temperature of the output flue gas from the boiler. Controlling the air supply temperature, results in an air temperature that is constant and independent of weather and atmospheric pressure conditions. This makes the flue gas a reliable source of high grade energy (heat) that may be utilized. Advantageously the heat of the flue gas is used to heat the boiler feed water (condensate returning from the turbine and, optionally, any make up water employed). The increased temperature of the flue gas can allow the boiler feed water to be pre-heated from what would otherwise be a comparatively low boiler water inlet temperature, and brought up to the required/desired temperature for feeding the boiler, without using the conventional approach of supplying additional energy from steam extracted from the turbine i.e. steam diverted from the turbine to heat the boiler feed water.

This allows a condensing steam turbine that does not require a steam extraction facility to be used in the system. This is advantageous as the turbine arrangement is simpler and able to extract more energy from a given volume of steam. For example it is not at a raised height to allow the downwards extraction of steam. Otherwise condensing steam turbines of the systems described herein may be conventional. Typically a high pressure steam turbine stage is fed with high pressure steam from the boiler. The used steam is returned for reheating in the boiler and then fed into lower pressure turbine stages, typically an "intermediate pressure" and then a "low pressure" stage. The steam exiting from the turbine stages is then condensed, and the condensate heated and pressurized for reuse in the boiler, to generate more steam. In this turbine arrangement more useful energy is extracted from the low pressure section than in a conventional steam turbine arrangement with steam extraction. This is advantageous as it allows the extraction of energy in a format that is aligned with the steam production profile of boilers dedicated to low grade fuels, such as biomass. This arrangement also removes the requirement to start the steam expansion process in the turbine at very high steam pressure and temperature. This is advantageous as it results in comparatively higher steam cycle efficiency; at moderate steam parameters and without the need for special or high grade materials of construction.

As steam is not extracted from the turbine, less input steam is required to achieve the same power output and so the boiler can be relatively smaller and using less materials than when making use of a conventional boiler and turbine arrangement.

When using the flue gas to heat the boiler feed water, it is energy efficient to condense the water contained in the gas. Preferably to fully or substantially fully condense the water contained in the gas. This may be achieved for example, by providing a two stage arrangement, preferably external to the boiler as a separate unit, wherein the condensate returning from the turbine first exchanges heat in a condenser/scrubber arrangement for the flue gas and then exchanges heat with the flue gas exiting from the boiler in a pre-cooler for the condenser/scrubber.

The condenser/scrubber condenses the water present in the flue gas and can remove ash or other undesirable contaminants from the combustion process. Thus the flue gas becomes two streams, gas and water. Both will contain some low grade heat which may for example be used to dry or pre-heat the fuel supplied for the boiler, especially if this is a biomass fuel such as wood chips. More generally low grade heat from a flue gas cooling and condensing system may be used as part of the heat pump system of the power generating system for any duty such as heating the air supply to the boiler, feed water heating or the option of supplying heat to dry biomass.

The arrangements described herein are particularly suited to biomass burning boilers, in particular fluidized bed boilers that can burn biomass such as (partially) dried wood chips without requiring special treatments such as milling, other than an appropriate degree of drying. Burning biomass does not produce substantial quantities of acid gases, as occurs with fossil fuels, and therefore equipment such as the advantageous precooling and condensing/scrubbing arrangements described herein do not have to be designed to cope with such corrosive materials. Biomass may be employed as the only or the primary fuel, for example a boiler may burn biomass such as wood. However a biomass boiler may also burn other fuel in conjunction with biomass (co-firing in the boiler), for example coal, lignite, municipal solid waste (MSW), refuse derived fuels (RDF), other refuse, and agricultural biomass/non-woody biomass.

If there is intention to co-fire other fuels with woody biomass (such as coal, lignite, agriculture or refuse fuels) that may be arranged by varying the boiler fluidized bed composition to the extent it is able to absorb acidity contained in the fuel mixture. In the case where any additional particulates may be expected in the flue gas stream, an appropriate electrostatic precipitator (ESP) may be introduced between the boiler flue gas outlet and the flue gas condensing arrangement.

The power generating system is suited to the generation of electrical power, in which case the condensing steam turbine can be coupled to an electrical generator in the usual way. A transformer arrangement can then be used to supply power to the electricity grid in the conventional manner. A further refinement of the system may be to make use of the heat energy provided from cooling the turbine, and/or the generator and/or the transformer to pre-heat the condensate (feed water) from the condensing steam turbine, before it is heated by the flue gas. This additional heating (energy recycling) may be directly (by heat exchanger) or by means of a heat pump. The heat pump or pumps employed may be a stand-alone item. Conveniently the heat pump or pumps are part of the heat pump system used for heating the air supplied to the boiler.

Generally, energy (low grade) collected from any part of the power generating system may be upgraded by heat pumps of the heat pump system and the upgraded energy used to heat the air being fed to the boiler and/or be used for other duties such as to (pre-) heat the condensate (feed water) from the condensing steam turbine. Other duties may include drying of fuel and/or the supply of heat to a district heating arrangement.

Thus the heat pump system may also use low grade heat from at least one of other points where heat is wasted/dissipated/rejected to provide additional heat for preheating feed water or combustion air through heat pumps. This includes heat wasted/dissipated/rejected from ash, other rotating equipment (flue gas fans, other fans, feed water pumps, mechanical drives, etc.) and electrical equipment (such as resistors, transformers etc).

Flexibility in addressing variable characteristics of the inputs of fuel and air is desirable to be able to provide/operate a standardized combustion process within the boiler. Therefore in order to respond to variable fuel characteristics (moisture and chemical composition), provide variable load and optimize efficiency at partial load; all electrical mechanical drives may be equipped with variable frequency controllers.

Thus a convenient arrangement provided by another aspect of the invention is a power generating system comprising;
- a fluidized bed boiler for burning biomass; and
- a condensing steam turbine fed with steam from the fluidized bed boiler;
- wherein the air supply for the fluidized bed boiler combustion process is preheated before entry to the boiler by means of a heat pump system comprising at least one heat pump that extracts energy from at least one of:
- the cooling system used to condense the steam from the turbine; and
- a cooling system used to recover heat from the flue gas from the boiler; and
- wherein the flue gas from the boiler is used to heat the boiler feed water.

The primary fuel for the boiler in this arrangement is biomass, but other fuel may be employed, co-fired in the boiler, as discussed above.

Conveniently the heat pump system may extract all the energy required to heat the air supply from the cooling system used to condense the steam from the turbine, or from the cooling system used to recover heat from the flue gas of the boiler. Typically, the heat pump system extracts energy from at least: the cooling system used to condense the steam from the turbine and from a cooling system used to recover heat from the flue gas from the boiler.

The heat pump system may supply heat to duties additional to heating the air supply to the boiler, for example to heat the condensate returning to the boiler, typically as a pre-heat stage before further heating with the flue gas, by means of a flue gas cooling and condensing system as described above.

With such arrangements a decrease in boiler size of say 20% or more may be envisaged in comparison with a conventional steam cycle plant with the same power output.

The further optional features discussed above with respect to the invention may also be employed with this convenient arrangement of a power generating system. For example the condensing steam turbine may be employed to drive an electricity generator in the conventional way.

By combining the use of a heat pump to preheat the air feed to the boiler and condensing the flue gases an increase in efficiency from a typical prior art steam cycle efficiency of 92% to above 100% may be obtained. A Low Heating Value (LHV) thermal efficiency as high as 110%, when heat recovery is taken into account, may be achievable with the systems described herein. Thus a boiler and condensing steam turbine system such as described herein has improved efficiency. Assuming a turbine efficiency of 42% or more the boiler/turbine system may have an improvement in efficiency of from say 39% for a conventional arrangement to 45% or more with an arrangement as described herein, depending on composition and qualities of selected equipment.

The power generating systems described herein are flexible in comparison to prior art arrangements. Usually options for control include altering the rate of supply of fuel and air for combustion in the boiler, and altering the feed rate of water for boiling. With the combination of using a heat pump to preheat the air feed to the boiler and obtaining heat by condensing the flue gases, both air input temperature and feed water temperature may also be adjusted to suit the desired output. This flexible arrangement may be described as an integration of the compression cycle of the heat pump (for the refrigerant employed) with the main steam cycle to form a "Co-integrated Steam and Compression Cycle (CSCC®)".

Particular flexibility is obtained by not using steam extraction from the turbine to heat the condensate returning to the boiler, especially when combined with both the use of the heat pump system's control of the air temperature into the boiler and the option of using a heat pump to provide some heat to the condensate. Rapid fine adjustment of air and water feed to the boiler may be made, to maintain the boiler combustion conditions irrespective of input (ambient) air temperature, and fuel quality. At the same time the output to the grid is readily adjusted as the heat pump system can be rapidly adjustable. Therefore, the boiler—turbine arrangement becomes flexible enough to provide variable electrical output to the grid including variations in power factor and frequency control.

The power generating systems described herein are scalable. A biomass boiler and condensing steam turbine arrangement based on a boiler output of from say 85 $MW_t$ to 300 $MW_t$ or more may be utilized. Systems with larger boilers and turbines may provide improvement in efficiency. It will also be appreciated that the power generating systems are not restricted to arrangements with one boiler and one condensing steam turbine. Thus for example combinations feeding more than one turbine (for example two turbines) from one boiler may be envisaged, as well as arrangements where more than one boiler is employed to provide steam for more than one turbine. In each arrangement the heating of air to each boiler and the use of heat pump technology to recover heat from turbine condensate cooling systems, flue gas cooling and condensing systems and other low grade heat sources such as described above, may be employed.

Where a biomass boiler or a boiler primarily using biomass as fuel is used and the flue gases cooled and condensed effectively the output flue gases are relatively concentrated in carbon dioxide, contain little in the way of acid gases or other contaminants, and have a relatively low temperature, say of the order of 20 to 50° C. or even lower if used for biomass drying duty or other duty as a supply of heat to the heat pump system. Such a gas stream lends itself to carbon capture. Therefore the system may further include a carbon capture unit to capture carbon dioxide. For example, by absorbing the carbon dioxide in a suitable solvent. The absorbed $CO_2$ may be liberated from the solvent and compressed for transportation and storage. Other methods for separating $CO_2$ may be employed such as high pressure membrane filtration, adsorption/desorption processes and cryogenic separation. As a biomass burning boiler using sustainable biomass is in principle carbon neutral, the addition of a carbon capture unit can render the power generating system carbon negative. Where the $CO_2$ is captured, heat recovery from that process may be utilized, optionally with the use of a heat pump to upgrade the quality of heat, in the power generating systems described herein; or for other applications requiring heat.

The present invention also provides a method for generating power, the method comprising:

providing a generating system comprising a condensing steam turbine fed with steam from a boiler, wherein the air supply for the boiler combustion process is preheated by means of a heat pump system comprising at least one heat pump, before entry to the boiler.

The method makes use of the power generating systems described herein including any or all of the optional features. For example the use of a heat pump extracting heat from a low grade energy source. The low grade energy source may be the cooling system employed to condense the steam from the condensing steam turbine or any of the other low grade energy sources associated with the power generating systems described herein.

Other sources of low grade heat, not directly associated with the power generating system may be employed as an alternative to or additionally to heat from the cooling system for the condensing steam turbine. For example energy from solar or geothermal sources or from cooling systems employed in factory processes.

The condensing of flue gases from a combustion system, allows recovery of heat both from the cooling of the gases and the latent heat of the condensation phase change. Combining this heat recovery with the use of a heat pump or heat pumps to upgrade low grade heat obtained from the cooling procedure and provide effective active cooling can find application in any system where flue gases are available.

Thus the present invention provides a method for extracting heat from the gases of a combustion process, the method comprising:

cooling the gases by heat exchange to condense the water present and upgrading the heat extracted from at least the condensation phase change by means of a heat pump.

Advantageously active cooling is employed, by using at least one variable drive heat pump and at least one variable circulation pump for a heat exchanger.

Conveniently a two stage method is employed for cooling the gases. A two stage arrangement, preferably external to a boiler producing flue gas or other source of gas from a combustion process, may be provided as a separate unit. The gas is first cooled to extract high grade heat by a first heat exchanger system and then cooled to condensation temperature by a second heat exchange system.

More than two stages of heat exchange may be employed to reach the condensation temperature.

A condenser/scrubber arrangement may be employed as the second heat exchange system.

At least one heat pump is employed to upgrade the heat obtained from the condensation stage. This allows the heat recovered to do more useful work. For example as described herein with respect to biomass boiler power generation systems.

Optionally the remaining heat in the gas from a combustion process after it has been cooled to the condensation point may be utilized. As the gas becomes two streams, gas and water and both will contain some low grade heat, this heat may be used. A further heat exchanger or heat exchanger may be used to upgrade the residual heat obtained from the gas or condensate streams.

This method of extracting heat may be utilized with gases from combustion processes in general, with energy saving benefits depending on the situation. Use with the biomass systems described herein is particularly convenient and adds flexibility to a power plant.

Other uses of the method can include with internal combustion engine gases ("exhaust gases"). Where an internal combustion engine is employed to drive an electrical power generator, heat may be extracted from the exhaust gases as well as from the cooling system for the engine. An example is described below.

Power generating systems such as the boiler and turbine arrangements described herein, and combustion power plants employing boiler systems in general, require an electrical supply for start-up. Electricity is required before the boiler and associated turbine are running at operational levels. The electricity can be supplied from the electricity grid, but only where a grid electricity supply is available.

Desirably an electricity generating power plant has a "black start" capability. The plant is equipped to start up without the need for external input of electrical power. This can be achieved by the provision of an internal combustion engine (or combustion turbine, or a fuel cell) powering an electrical generator (all of these options may be in single or multiple assemblies in parallel operation), for use in start-up procedures. An engine, typically a gas powered piston engine has the benefit of being flexible, the power output is readily adjusted to cope with a varying load. Other liquid or gaseous fuels may be employed, for example diesel, bio-diesel, natural gas, synthetic gas, bio-gas, heavy fuel oil (HFO,) Liquid Petroleum Gas (LPG), Liquid Natural Gas (LNG), hydrogen, etc.

The internal combustion engine may be used for power generation not only on start-up, but as a means of increasing the flexibility of the plant. Additional power may be added to the output of the electricity generating plant as a whole, by running the engine. As an engine/generator system is flexible in output, the engine system can give the ability to add incrementally to the overall output of the plant.

Advantageously the heat from the engine cooling system is extracted, by a heat exchanger, for use in heating. For example, to heat the air and/or water input to a boiler. Advantageously the method described above for extracting heat from gases of a combustion engine is employed with the exhaust gas from the engine. Thus the engine may be provided with a two stage arrangement. The exhaust gas is first cooled to extract high grade heat by a first heat exchanger system and then cooled to condensation temperature by a second heat exchange system. At least one heat pump may be used to upgrade the heat from the condensation step to allow useful work to be done. The heat pump may be one used for scavenging heat from other low grade sources of heat or may be dedicated to this duty. The heat pump may be stand alone or part of the heat pump system of the power systems of the invention.

As well as the method for extracting heat from flue gases the present invention provides an apparatus for extracting heat from gases of a combustion system comprising:

a heat exchange system to cool the gases to the condensation temperature; and at least one heat pump for upgrading the heat extracted from at least the condensation phase change.

Heat extracted from the engine during its operation may be used to heat combustion air or feed water (condensate) directly and immediately or may be stored in an appropriate heat storage device for later use. Heat rejected from the engine may be used to supplement the power generation process within the main thermal cycle of the plant described above.

The apparatus may include any or all the features discussed above in respect of the method and of the power generating systems described herein.

DETAILED DESCRIPTION OF THE INVENTION

Figure 1:
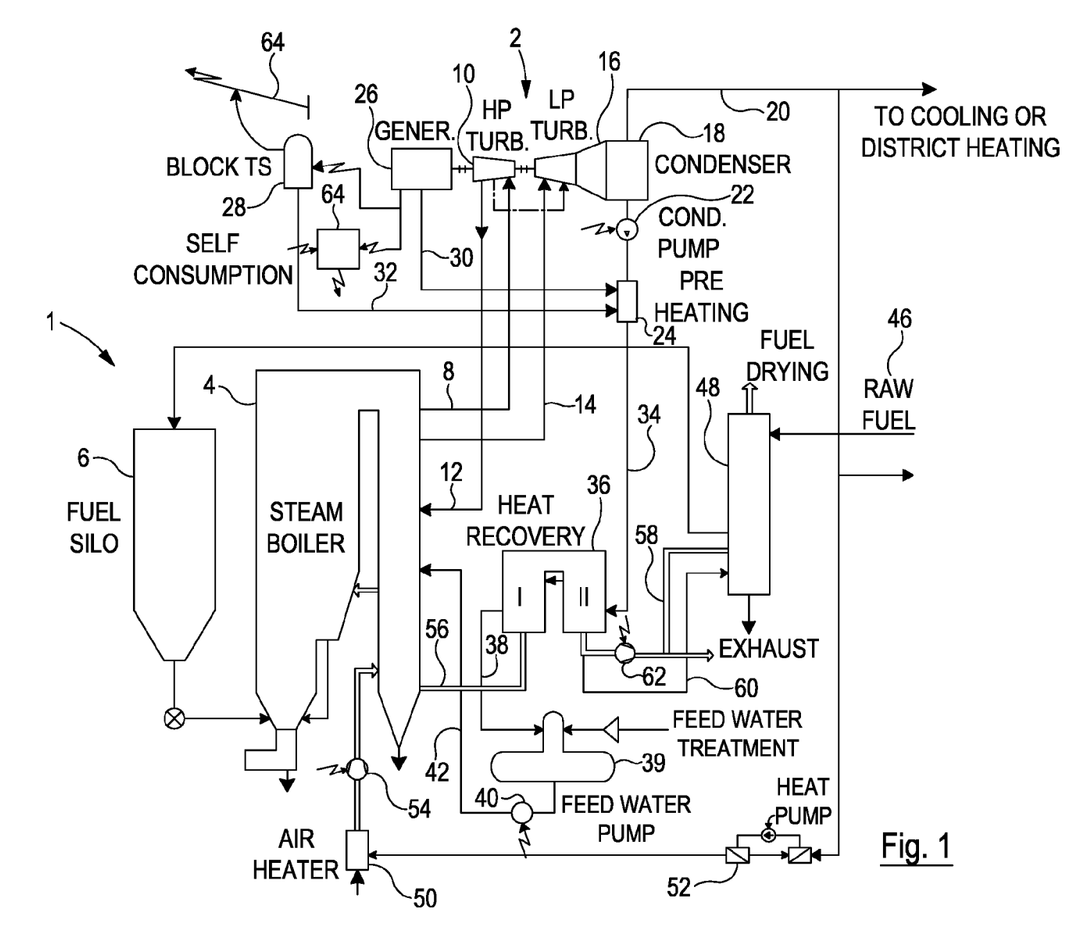
FIG. 1 shows a power generating system in schematic view.

FIG. 1 is a schematic illustration of a power generating system 1 that includes a condensing steam turbine arrangement 2 fed with steam from a boiler 4, in this example a fluidized bed boiler burning a biomass such as wood chips, at least as the primary fuel.

Steam Cycle

The steam cycle operating in the system 1 can be described as follows. Biomass fuel from the fuel silo 6 is burned in air in the fluidized bed boiler 4. The heat is used in the boiler to boil water and generate high pressure steam which is fed from boiler 4 via line 8 to drive the high pressure turbine 10 (HP. TURB.) of the turbine 2. Used steam is returned to boiler 4 via line 12 for reheating in the conventional manner. The reheated steam is then supplied via line 14 to the low pressure turbine(s) 16 (LP. TURB.) of the turbine 2. Typically an "intermediate" and a "low" pressure turbine system is employed to maximize extraction of power. The steam exiting from the low pressure turbine(s) 16 is condensed in condenser 18 by use of a cooling water system indicated by line 20.

The condensed steam is pumped by condensate pump 22 through a preheating heat exchanger 24 that makes use of heat extracted from the cooling systems for electrical generator 26 and transformer 28, as suggested by lines 30, 32.

The condensate is then fed via line 34 to be heated further in a heat recovery system 36 making use of flue gas from boiler 4 as described further hereafter under the heading Flue Gas. Finally the heated condensate is pressurized and returned—via line 38, storage tank 39 (the "drum"), feed water pump 40, and line 42—to boiler 4 for conversion back to steam. Any required make up water is delivered from the feed water treatment plant 44.

Fuel

The fuel supply in this example is wood chips. A fluidized bed combustion system is employed in boiler 4 that does not require special processing, such as milling, of the raw fuel. The raw fuel 46 is however dried in a fuel drying plant 48 before being fed to silo 6 that feeds the combustion process in boiler 4. A moisture content in the range of about 9 to 50% is suitable for the system envisaged, but is not critical.

Air Supply

The air supplied to boiler 4 via air heater 50. The air is heated in air heater 50 by meant of variable drive heat pump or pumps 52 which extracts heat from the cooling water system (line 20) for the condenser 18 of the turbine 2. The heated air is then pumped into boiler 4 via fan or fans 54. Other sources of relatively low grade heat may be employed alternatively or additionally. However use of the condenser turbine cooling water system increases the extraction of energy from the steam cycle improving efficiency. This arrangement allows the air to the boiler 4 to be supplied at a consistent temperature, essentially regardless of ambient air temperature and without requiring heat exchange inside the boiler, with exiting flue gas, as is typically employed.

Flue Gas

The flue gas exits from boiler 4 via line 56 to heat recovery unit 36. As a consequence of the supply of heated air to boiler 4 the flue gas is consistent in temperature and somewhat hotter than in a conventional arrangement where ambient temperature air is fed into the boiler and heated by flue gas as it exits. The heat recovery unit 36 treats the flue gas in two stages. In stage I the flue gas exiting from the boiler 4 is pre-cooled by exchanging heat with the condensate returning to the boiler from the condenser turbine 18. In stage II a condenser scrubber unit condenses the steam in the flue gas and removes ash. The cooling and condensing of the flue gas in stage II of heat recovery unit 36 is obtained by heating the condensed steam returning to the boiler via line 34.

Thus the flue gas becomes two streams, gas and water. Both contain some low grade heat (having a temperature of about 40C for example) and either or both are fed to fuel drying unit 48 (via lines 58, 60 and pump 62) to dry the fuel supplied for the boiler.

Power Output

In this example the condensing steam turbine 2 drives generator 26 to produce electricity, which is converted by transformer 28 to a suitable form for supply to the grid 64. A portion of the power generated is used for "self-consumption" 64 for example used to power pumps such as 22, 42, 54 and 62; and heat pump 52.

The energy efficiency and the lack of sensitivity to ambient conditions of the arrangement of FIG. 1 described above allows the use of a standardized and more compact power generating system to produce a given power output than can be realized with previous known arrangements.

Figure 2:
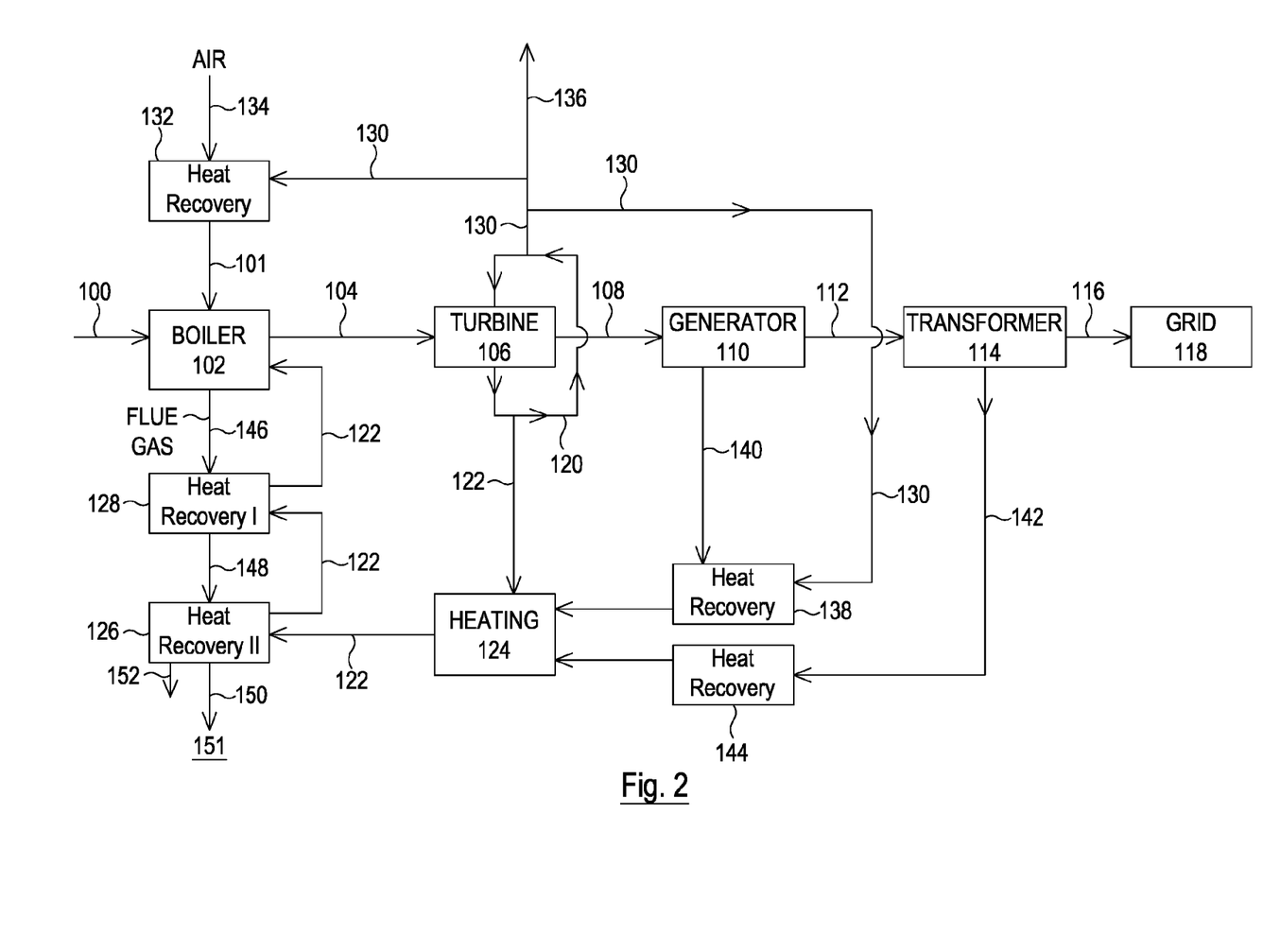
FIG. 2 shows a simplified schematic drawing of a power generating system as a block diagram.

FIG. 2 shows a power generating system akin to that of FIG. 1 as a schematic block diagram, generally indicating the mass and energy flows.

In FIG. 2 fuel 100 and heated air 101 is supplied to boiler 102. Steam 104 generated by burning the fuel in the boiler 102 is fed to the turbine 106. Mechanical power 108 from the turbine 106 drives generator to produce electricity 112 which is adjusted by transformer 114 to be suitable as electricity supply 116 to grid 118.

Spent steam from turbine 106 is condensed by cooling circuit 120 to provide condensate 122, which is returned to the boiler 102 via pre-heater 124 and flue gas heat recovery units II (126) and I (128). The condensate 120 will also be pressurized to provide a feed to the boiler that is at an appropriate temperature and pressure.

Cooling circuit 120 (typically a water cooling circuit) provides relatively low grade heat 130 which is used in a heat recovery unit 132 (by means of a heat pump arrangement) to heat incoming air 134 for the boiler 102, providing heated air 101. The heat 130 from cooling circuit 120 may also be employed as an external heat supply 136, for example for district heating. A yet further use of heat 130 may be to supply heat via heat recovery unit 138 to the pre-heater 124 which heats condensate 122 from the turbine 106. Heat recovery unit 138 may also be supplied with heat 140 from a cooling circuit for generator 110. In this example heat 142 is also recovered, from a cooling circuit used to cool transformer 114 and fed via another heat recovery unit 144 to pre-heater 124.

Flue gas 146 emanating from the boiler 102 is pre-cooled in heat recovery unit I (128) by the returning condensate 122. The pre-cooled flue gas 148 is then further cooled and water present in the stream condensed out in heat recovery unit II (126), which also makes use of the returning condensate 122 as coolant. The cooled dried flue gas 150 emanating from heat recovery unit II (126) may then be used further for drying fuel as shown in the arrangement of FIG. 1. The cooled dried flue gas 150 may then be processed in a carbon capture unit 151 to recover the carbon dioxide. Condensate 152 obtained from the flue gas may also be utilized, for example, for drying fuel as shown in FIG. 1.

In this example heat recovery in unit 132 is by means of a heat pump as part of a heat pump system. It will be understood that other heat recovery in systems of the invention may, in each instance, be by making use of heat exchangers, heat pumps or both heat exchangers and heat pumps in combination.

For example, the heat recovery units in any one of units 126, 128, 138 and 144 shown in FIG. 2 may use heat exchangers, heat pumps or both heat exchangers and heat pumps.

Figure 3:
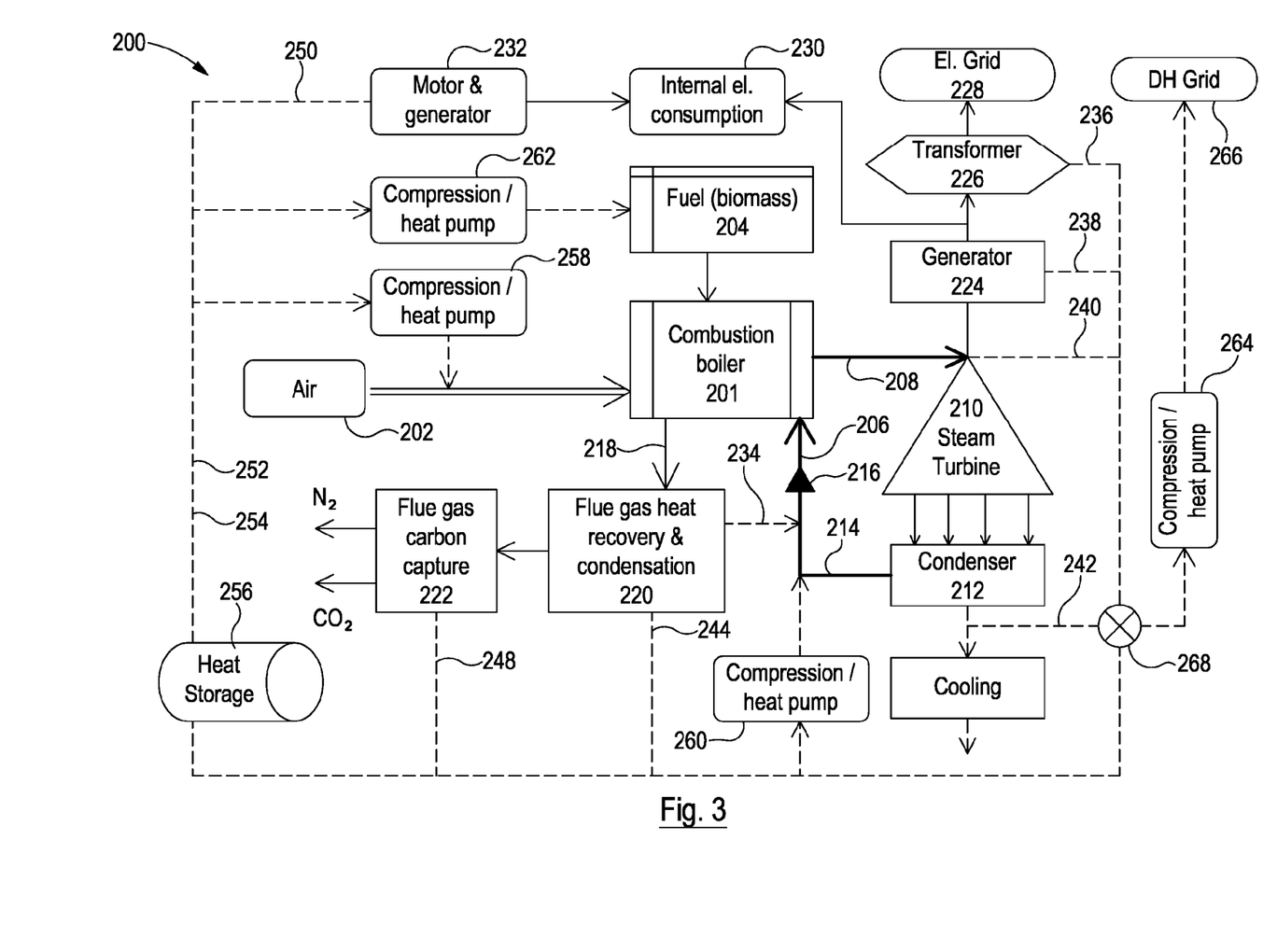
FIG. 3 shows a simplified schematic drawing of a power generating system as a block diagram, highlighting the recovery of low grade heat for upgrading in a heat pump system.

FIG. 3 shows in a simplified schematic block diagram features of a power generating system 200 of a general type similar that of FIG. 1. This illustration is focussed on the recovery of low grade energy for a heat pump system. In this example the heat pump system collects low grade heat from several sources and in turn uses heat pumps to upgrade the heat to perform several useful heating functions.

Steam Cycle

The power generating system includes a combustion boiler 201 fed with air 202, fuel 204 and heated pressurized water 206. Steam produced by the boiler 200 is fed by line 208 to the steam turbine 210. The spent steam is condensed in condenser 212 and returned by line 214, including compression pump 216 to the boiler 201 for reuse.

Flue Gas

The flue gas (line 218) from the boiler 201 is cooled and condensed in a unit 220 such as the two stage heat recovery unit 36 described above with respect to FIG. 1. The remaining gases (mostly nitrogen and carbon dioxide) following condensation may progress to optional carbon capture unit 222.

Power Output

In this example the condensing steam turbine 210 drives generator 224 to produce electricity, which is converted by transformer 226 to a suitable form for supply to the grid 228. A portion of the power generated is used for "self-consumption" 230, for example used to power pumps.

In this example a start-up motor and generator unit 232 is available for use in start-up of the system 200. The motor may be a gas piston engine or a gas turbine, for example. The motor and generator unit 232 may also be used more routinely to add to the output of the system 200, by being run, as required to generate electricity. This adds to the flexibility of system 200.

Heat Recovery and Heat Pump System

Dashed line 234 indicates the use of heat from the flue gas heat recovery and condensation unit to heat the condensate returning via line 214 to the boiler 201.

All the other dashed lines in the figure illustrate recovery of low grade heat from various sources, the upgrading of the heat by heat pumps of the heat pump system and the use of the upgraded heat for various duties.

Thus low grade heat is recovered as indicated by dashed lines 236, 238, 240, 242, 244, 248 and 250 from, respectively: the transformer 226; the generator 238; cooling the turbine 240; the condenser for the turbine 212; flue gas heat recovery and condensation 220, flue gas carbon capture 222; and the motor and generator unit 232.

In this example all the low grade heat recovery is pooled as suggested by linking line 252 as part of a heat pump system 254. The heat pump system includes optional heat storage 256, for example a tank of water.

The heat pump system includes variable drive compressor heat pumps. One or more heat pumps are employed for each duty as follows: at 258 for heating the air input 202 to the boiler; at 260 for heating the condensate returning to the boiler in line 214; and at 262 for drying the biomass fuel 204.

Also included in this figure is the optional use of another heat pump or pumps at 264 for supply of upgraded heat to a district heating system (DH grid 266), accessible if desired by control system 268.

The invention claimed is:

1. A power generating system comprising:
a condensing steam turbine fed with steam from a boiler, wherein an air supply to the boiler for a boiler combustion process in the boiler is preheated before entry to the boiler by means of a heat pump system comprising at least one variable drive heat pump;
wherein the condensing steam turbine is coupleable to an electrical generator for generating electricity, a transformer is connected to the electrical generator for supply of electricity to a grid, and
wherein energy provided from at least one of cooling the electrical generator and cooling the transformer is used to pre-heat condensate returning from the condensing steam turbine, by direct heat exchange or via the heat pump system.

2. The power generating system of claim 1, wherein the heat pump system extracts heat from a cooling system employed to condense steam from the condensing steam turbine.

3. The power generating system of claim 1, wherein the heat pump system extracts heat from a flue gas cooling and condensation process of the power generating system.

4. The power generating system of claim 1, wherein the heat pump system extracts heat from at least one of:
a waste heat from rotating equipment; a waste heat from transformation equipment; a waste heat from cooling the steam turbine or a waste heat from ash disposal.

5. The power generating system of claim 1, wherein the heat pump system or a heat exchange system extracts heat from at least one of: an energy source or sources selected from the group consisting of: a solar energy source, a geothermal energy source or a factory process energy source.

6. The power generating system of claim 1, wherein the heat pump employs a variable drive compressor.

7. The power generating system of claim 1, wherein the boiler is a biomass burning boiler, wherein the boiler is one of a:
fluidized bed biomass burning boiler; or
fluidized bed biomass burning boiler and where a combustion temperature is controlled to minimize $NO_x$ formation.

8. The power generating system of claim 1, wherein a flue gas from the boiler is used to heat boiler feed water.

9. The power generating system of claim 1, wherein the condensing steam turbine is not provided with a steam extraction facility for boiler feed water pre-heating.

10. The power generating system of claim 1, wherein a flue gas from the boiler is used to heat boiler feed water; and
wherein water in the flue gas is condensed by cooling from the boiler feed water and/or by a cooling, heat extraction, side of the at least one variable drive heat pump of the heat pump system.

11. The power generating system of claim 10, wherein water in the flue gas is substantially fully condensed.

12. The power generating system of claim 10, wherein the water in the flue gas is condensed in a two stage arrangement wherein condensate returning from the condensing steam turbine first exchanges heat in a condenser/scrubber arrangement for the flue gas, directly or via a heat pump arrangement, and then exchanges heat with the flue gas exiting from the boiler in a pre-cooler for the condenser/scrubber.

13. The power generating system of claim 12, wherein heat from at least one of gas and water from the flue gas, after the pre-cooler and condenser/scrubber, is used to dry or heat fuel supplied to the boiler.

14. The power generating system of claim 1, wherein the condensing steam turbine is coupled to an electrical generator for generating electricity.

15. The power generating system of claim 1, wherein condensate returning from the condensing steam turbine is heated only by heat from flue gas from the boiler before being fed to the boiler.

16. The power generating system of claim 1, wherein at least one of:
more than one condensing steam turbine is provided;
more than one boiler is provided;
the system further comprises a carbon capture unit;
the system further comprises a generator powered by an engine or other means, for starting up and/or augmenting the power generating system; and/or
the working fluid for the heat pump system is selected from the group consisting of carbon dioxide, ammonia, organic fluids and halocarbons.

17. A method for generating power, the method comprising:
operating a power generating system comprising a condensing steam turbine fed with steam from a boiler, wherein an air supply to the boiler for a boiler combustion process in the boiler is preheated before entry to the boiler by means of a heat pump system comprising at least one variable drive heat pump; and
wherein energy provided from at least one of cooling an electrical generator and cooling a transformer is used to pre-heat condensate returning from the condensing steam turbine, by direct heat exchange or via the heat pump.

18. The method for generating power according to claim 17, wherein at least one heat pump of the heat pump system also provides active cooling to any equipment within the power generating system that benefits from being operated at a regulated temperature.

19. The method for generating power according to claim 18 wherein;
the active cooling is supplied to at least one of: the condensing steam turbine, a generator, a transformer or other rotating equipment of the power generating system.

* * * * *